United States Patent [19]

Teramachi

[11] Patent Number: 4,695,170
[45] Date of Patent: Sep. 22, 1987

[54] ENDLESS BALL SPLINE

[76] Inventor: Hiroshi Teramachi, 34-8, Higashitamagawa 2-chome, Setagaya-ku, Tokyo, Japan

[21] Appl. No.: 917,579

[22] Filed: Oct. 10, 1986

[30] Foreign Application Priority Data

Oct. 15, 1985 [JP] Japan .............................. 60-156509[U]

[51] Int. Cl.$^4$ ............................................ F16C 29/06
[52] U.S. Cl. ........................................ 384/45; 384/43
[58] Field of Search .................................... 384/43–45

[56] References Cited

FOREIGN PATENT DOCUMENTS

| 52-76547 | 6/1977 | Japan . |
| 53-54638 | 5/1978 | Japan . |
| 53-22210 | 7/1978 | Japan . |
| 55-159321 | 12/1980 | Japan . |
| 58-29289 | 6/1983 | Japan . |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

An endless ball spline has an outer casing provided in the inner peripheral surface thereof which a plurality of axially extending parallel grooves including loaded ball grooves and cage securing grooves serving also as non-loaded ball grooves. A pair of cages are fitted inside the outer casing in such a manner that both axial ends of the combined cages project from both axial ends, respectively, of the outer casing, each cage having cage sucuring pieces at each end thereof. A plurality of annular grooves are formed in each cage. End covers are respectively fitted on the combined projecting portions of the cages fitted in the outer casing. Each end cover is provided with ball turning grooves which are respectively communicated with the corresponding axial grooves formed in the outer casing and which respectively oppose the corresponding ball turning grooves formed in the cages. The outer casing, the cages and the end covers are assembled together to define ball recirculating endless track bores. Each ball turning portion is defined by a tubular passage with a circular cross-section which is conformable with the configuration of the balls. Therefore, the balls are able to turn smoothly, so that it is possible to prevent generation vibrations and noise.

1 Claim, 12 Drawing Figures

FIG. 7
FIG. 8
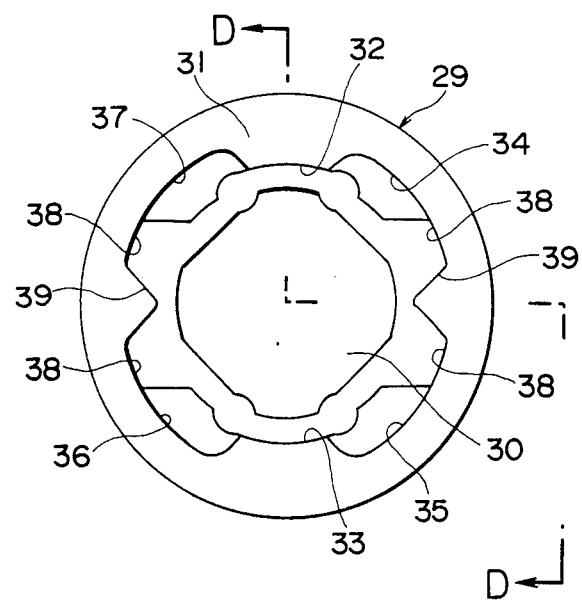
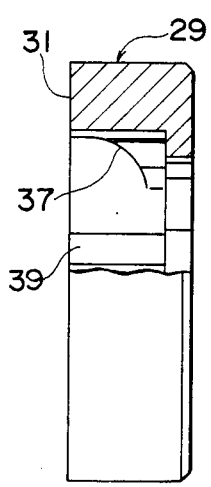
FIG. 9
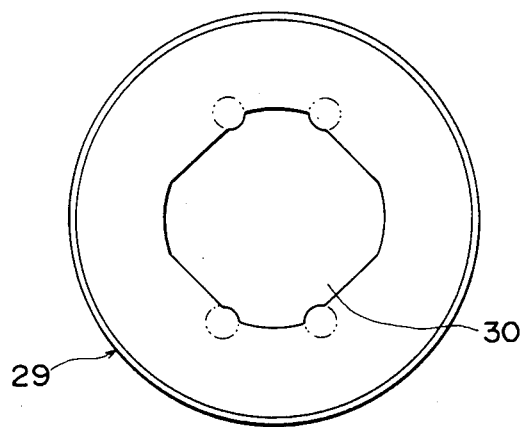

ENDLESS BALL SPLINE

FIELD OF THE INVENTION AND RELATED ART STATEMENT

The present invention relates to an endless ball spline. More particularly, the present invention pertains to an endless ball spline for use in a motional mechanism which is required to perform an axially linear reciprocating motion or a rotational motion for torque transmission alone or these two kinds of motion in combination, in a precision machine, labor-saving apparatus, measuring machine, machine tool, etc.

An endless ball spline of the type described above has heretofore been known which comprises: a spline bearing including an outer casing provided in the inner surface thereof with loaded ball guide grooves, non-loaded ball guide grooves and circumferential ball turning grooves, a ball retainer fitted inside the outer casing and having a plurality of annular grooves, and a multiplicity of balls rollably retained within a plurality of ball recirculating endless tracks defined by the outer casing and the ball retainer; and a spline shaft with a specific configuration which is supported through the multiplicity balls in the spline bearing (see the specifications of Japanese Patent Publication No. 22210/1978 and Japanese Utility Model Publication No. 29289/1983).

In the above-described conventional endless ball spline, the circumferential grooves for turning the balls are circumferentially provided in the inner surface of the outer casing made from a steel material or a steel tubing, and these grooves connect the loaded and non-loaded ball guide grooves which are similarly formed in the inner surface of the outer casing to define in combination annular ball recirculating grooves. The operation of cutting these circumferential grooves is not particularly difficult when these grooves are formed in an outer casing having an ordinary size, i.e., a diameter of about 150 mm to 15 mm, by means of machining. However, as the inner diameter of the outer casing is decreased, it becomes more difficult to form circumferential grooves because highly accurate machining with a small-sized tool is needed in order to accurately connect the loaded and non-loaded ball guide grooves so that the balls can recirculate smoothly. Accordingly, the above-described arrangement of the outer casing of the conventional endless ball spline disadvantageously limits the range within which the overall size of an endless ball spline can be reduced although endless ball splines with reduced sizes are demanded to cope with the recent need for reduction in size of machines or apparatuses in various fields.

There is another type of the related art, known as a ball bush and a linear motion ball bearing, in which axially extending tracks for a loaded ball region and a return region are formed in the inner surface of an outer sleeve corresponding to the outer casing in accordance with the present invention, and a cage is fitted inside the sleeve, the cage being defined by a plastic tubular member which guides balls and has annular grooves including ball turning grooves, and the cage being covered with a plastic end ring (see the specifications of Japanese Patent Public Disclosure Nos. 76547/1977 and 54638/1978).

There is still another type of known ball spline which includes: an outer casing having a plurality of axially extending loaded and non-loaded ball guide grooves alternately provided in the inner surface thereof; a substantially tubular cage fitted inside the outer casing and provided with a plurality of annular grooves including ball turning groove portions which are so formed as to project from both axial ends, respectively, of the outer casing; and end covers which respectively cover the projecting portions formed at both ends of the cage and each of which has circumferential grooves each connected to a pair of loaded and non-loaded ball guide grooves formed inside the outer casing so as to define a ball recirculating endless track bore together with the corresponding annular groove provided in the cage (see the specification of Japanese Patent Public Disclosure No. 159321/1980).

The above-described conventional ball bush, linear motion ball bearing and ball spline suffer, however, from the following problems. Namely, the cage in any of these prior arts is defined by a cylindrical or substantially cylindrical member provided with a plurality of annular grooves, and it is therefore necessary to employ a split mold consisting of three divided parts for forming such cage by integral molding process. Since this type of split mold is costly, the production cost of the cage is unfavorably high. Further, since the cage is formed by means of molding using a split mold consisting of three parts, it is considerably difficult to uniformly assign annular groove forming positions to various portions of a cylindrical or substantially cylindrical member, which means that there is a fear of a dimensional error being produced between the corresponding grooves. In addition, since a cylindrical or substantially cylindrical member is integrally formed as one unit, any dimensional error between the inner diameter of the outer casing and the outer diameter of the cage cannot be absorbed. When the outer diameter of the cage is smaller than the required value, play or chattering occurs between the cage and the outer casing; when the outer diameter of the cage is greater than the inner diameter of the outer casing, the cage cannot be fitted into the outer oasing, which means that it is impossible to effect assembling. If there is an error between the corresponding grooves provided in the cage or an error in fitting between the cage and the outer casing, the grooves of the cage are undesirably offset from the corresponding grooves formed in the inner surface of the outer casing.

OBJECT AND SUMMARY OF THE INVENTION

Accordingly, it is a primary object of the present invention to provide an endless ball spline so designed that the outer casing is provided with grooves which can be formed by machining carried out in its axial direction alone, thereby enabling grooves to be accurately formed in even an outer casing having a relatively small inner diameter by virtue of ease of machining, and thus allowing a reduction in size of the endless ball spline, and that a pair of cages of the same configuration which can be formed readily and inexpensively are reliably retained within the outer casing in symmetry with each other with respect to a diameter of the outer casing, thereby allowing each of the balls to recirculate smoothly through ball recirculating endless track bores defined by the outer casing, the cages and the end covers.

To this end, the following technical means are used for the endless ball spline according to the present invention.

Namely, the outer casing is provided in the inner peripheral surface thereof with a pair of grooves with a Ushaped cross-section which extend in the axial direction thereof and in opposing relation to each other. Loaded ball guide grooves are formed on both sides, respectively, of the bottom of each of the U-shaped grooves. Similarly, a pair of ridges with a triangular cross-section are provided in such a manner as to extend in the axial direction of the outer casing and in opposing relation to each other in a direction which is perpendicular to the plane which intersects both the U-shaped grooves. Cage securing grooves with a substantially trapezoidal cross-section are formed on both sides, respectively, of each of the triangular ridges. Further, annular slanted sufaces are formed at both axial ends, respectively, of the inner periphery of the outer casing, each annular slanted surface expanding or diverging outward.

Each of the pair of cages fitted inside the outer casing has an inner peripheral surface with a substantially V-shaped cross-section and is provided with a plurality of annular grooves in the outer peripheral surface thereof. Among these annular grooves, loaded ball grooves which respectively correspond to the loaded ball guide grooves provided in the outer casing are formed in the substantially central portion of the outer peripheral surface of the cage in such a manner that the grooves extend in the axial direction of the cage. Each of the loaded ball grooves formed in each cage is provided in the inner peripheral surface thereof with a slot having a diameter slightly smaller than the diameter of the balls. Further, non-loaded ball grooves are provided at both lateral ends, respectively, of the outer peripheral surface of each cage, each non-loaded ball groove being communicated with the corresponding loaded ball groove through a ball turning groove which is formed at each axial end of the cage in such a manner as to project axially from the corresponding end of the outer casing.

The pair of end covers are respectively fitted on the combined axially projecting portions of the cages fitted in the outer casing, and connected to both end faces, respectively, of the outer casing. Each end cover has a substantially U-shaped cross-section and is provided in its center with a through-hole having a diameter slightly larger than the outer diameter of the spline shaft. Further, each end cover has ball turning grooves formed in the inner peripheral surface thereof, the ball turning grooves respectively opposing the ball turning grooves formed in the cages. In addition, a pair of ridges with a triangular cross-section are formed on the inner peripheral surface of each end cover in such a manner as to extend in the axial direction thereof and in opposing relation to each other, and grooves with a substantially trapezoidal cross-section are formed on both sides, respectively, of each of the triangular ridges.

The spline shaft has a substantially square crosssection and is provided with ball rolling grooves on both sides, respectively, of each of the diagonally opposing corners thereof, the ball rolling grooves being adapted to transmit torque to the loaded ball guide grooves of the outer casing through the loaded balls.

It should be noted that the outer casing, the cages and end covers define in combination ball recirculating endless track bores.

As described above, the endless ball spline according to the present invention has cage securing grooves formed in the outer casing. Therefore, the walls of the end faces of each cage on the sides thereof which are closer to the corresponding non-loaded ball grooves, respectively, together with the axially distal ends of the side walls, are brought into close contact with the bottom walls of the corresponding cage securing grooves, thus allowing the cages to be reliably retained by the outer casing. Accordingly, any rotational force applied to this spline bearing cannot cause any circumferential relative movement (offset) between the cages and the outer casing.

Since the cages are defined by a pair of pieces having an inner peripheral surface with a substantially V-shaped cross-section, a mold employed for forming each cage need not be split, and it is possible to use a mold which has a relatively small size and a relatively simple configuration. Accordingly, it is possible to produce the cage at a reduced cost and with a favorably high degree of accuracy in finishing. Since each cage is defined by a piece with a substantially V-shaped inner peripheral surface, when each cage is fitted into the corresponding cage securing grooves in the outer casing as described above, any possible slight error in production in the circumferential direction is advantageously absorbed in the range within which the material of the cages can be elastically deformed.

In addition, since the annular slanted surfaces are formed at both axial ends, respectively, of the inner peripheray of the outer casing in such a manner that each slanted surface expands or diverges outward, when the balls rolling through the loaded ball guide grooves reach the slanted surfaces, they are released from all loads including preload, which means that the balls are smoothly advanced into the ball turning grooves.

Each end cover is provided in the inner surface thereof with ball turning grooves at respective positions which oppose the corresponding ball turning grooves formed at both axial ends of the cages in such a manner as to project from the both axial ends of the outer casing, these ball turning grooves having substantially the same configuration as each other, thereby allowing formation of tubular passages with a circular cross-section which are conformable with the configuration of the balls. Accordingly, the rolling friction of the balls is minimized, so that it is possible to change even more smoothly the course of the balls advanced from the slanted surface portions of the outer casing, and also to prevent generation of noise due to recirculation of the balls.

Since the inner surface of the outer casing has no groove which needs machining carried out in the circumferential direction but is provided with grooves such as loaded ball guide grooves and cage securing grooves extending in the axial direction alone, it is possible to readily form grooves in even a tubular member with a relatively small diameter by means of relatively easy and simple machining process such as turning or drawing. Accordingly, it is possible to produce an endless ball spline which has a reduced cost and a reduced size.

In the endless ball spline according to the present invention, a highly rigid steel material is employed for the outer casing, the spline shaft and the balls, which are to bear a relatively heavy load, whereas a plastic material which has wear resistance and is lightweight as well as moldable is employed for portions or members which do not directly bear any heavy load, such as the cages and the end covers. Thus, the strength required for each of the parts is sufficiently satisfied, and it is possible to reduce the size and costs of the product.

BRIEF DESCRIPTION OF THE DRAWINGS

The accompanying drawings show in combination one embodiment of the endless ball spline according to the present invention, in which:

FIG. 7 is a front view of an end cover employed in the endless ball spline;

FIG. 8 is a partially-sectioned side view of the end cover taken along the line D—D in FIG. 7;

FIG. 9 is a side view of the end cover shown in FIG. 8, as viewed from the right-hand side thereof;

DETAILED DESCRIPTION OF PREFERRED EMBODIMENT

Figure 1:
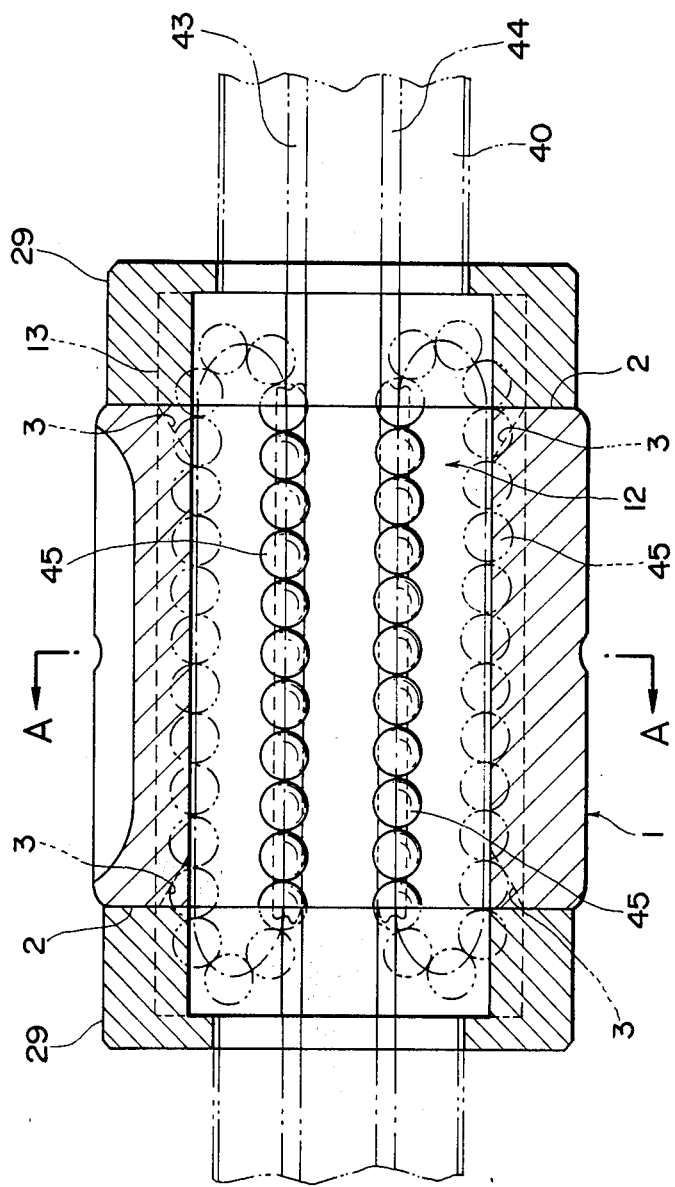
FIG. 1 is a sectional side view of a spline bearing.
Figure 2:
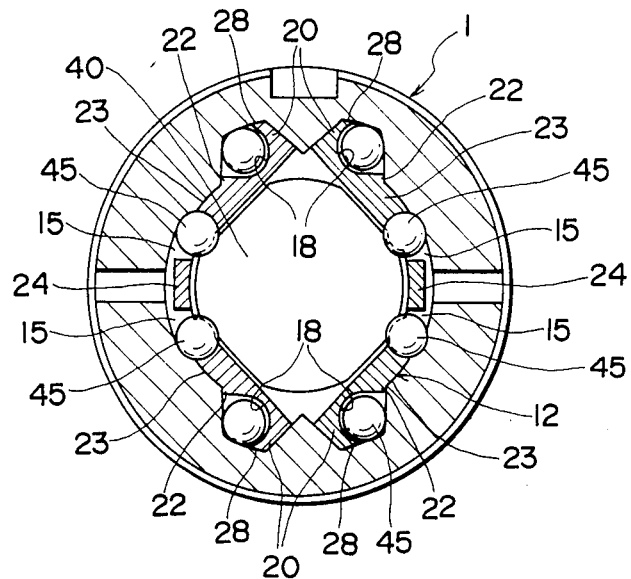
FIG. 2 is a sectional front view taken along the line A—A in FIG. 1.
Figure 3:
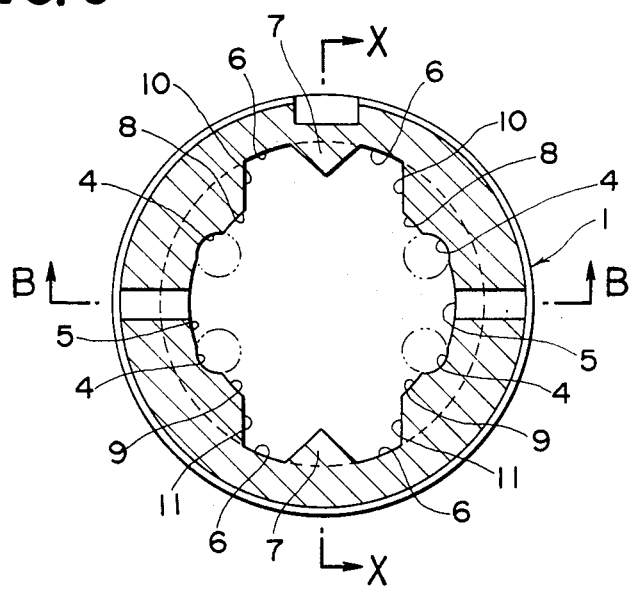
FIG. 3 is a sectional front view of an outer casing.

One preferred embodiment of the present invention will be described hereinunder in detail with reference to the accompanying drawings.

Referring to FIGS. 1 to 4, the endless ball spline according to the present invention comprises an outer casing 1 provided with axial raceway grooves; a pair of symmetrical cages 12 fitted inside the outer casing 1 in such a manner that both axial ends of each cage 12 respectively project from the corresponding axial ends of the outer casing 1; end covers 29 respectively fitted on projecting portions 13 of the cages 12; a spline shaft 40; and a multiplicity of balls 45.

Figure 4A:
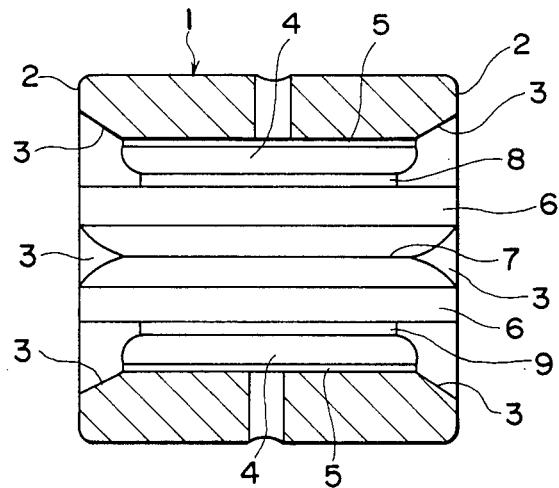
FIG. 4A is a sectional side view taken along the line B—B in FIG. 3.
Figure 4B:
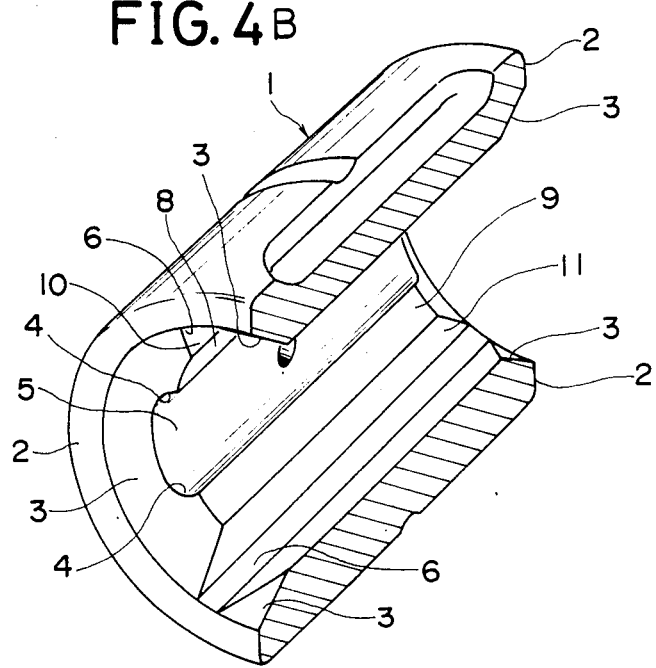
FIG. 4B is a sectional perspective view taken along the line X—X in FIG. 3.

Both axial end portions of the inner peripheral surface of the outer casing 1 are tapered to provide annular slanted surfaces 3 which expand or diverge outward, so that balls which reach the slanted surfaces 3 are released from any kind of load, including preload (see FIGS. 4A and 4B).

Grooves 5 having a U-shaped cross-section are formed in the inner peripheral surface of the outer casing 1 in such a manner that the grooves 5 extend parallel with each other in the axial direction of the outer casing 1 and in bisymmetry with each other. Loaded ball guide grooves 4 ar provided in both side surfaces, respectively, of the bottom of each of the U-shaped grooves 5. In addition, ridges 7 having a substantially triangular cross-section are formed on the inner peripheral surface of the outer casing 1 in such a manner that the ridges 7 extend in the axial direction of the outer casing 1 in symmetry with each other with respect to the plane which intersects both the U-shaped grooves 5. A pair of cage securing grooves 6 having a substantially trapezoidal cross-section are formed on both sides, respectively, of each of the ridges 7 in such a manner that the grooves 6 are in bisymmetry with each other and this pair of grooves 6 are also in symmetry with the pair of grooves 6 provided on the opposite side with respect to the plane which intersects both the U-shaped grooves 5 (see FIG. 3).

Partition walls 8 are formed in bisymmetry with each other between the cage securing grooves 6 and the loaded ball guide grooves 4, respectively, and partition walls 9 are similarly formed between the other cage securing grooves 6 and the other loaded ball guide grooves 4, respectively.

Figure 5:
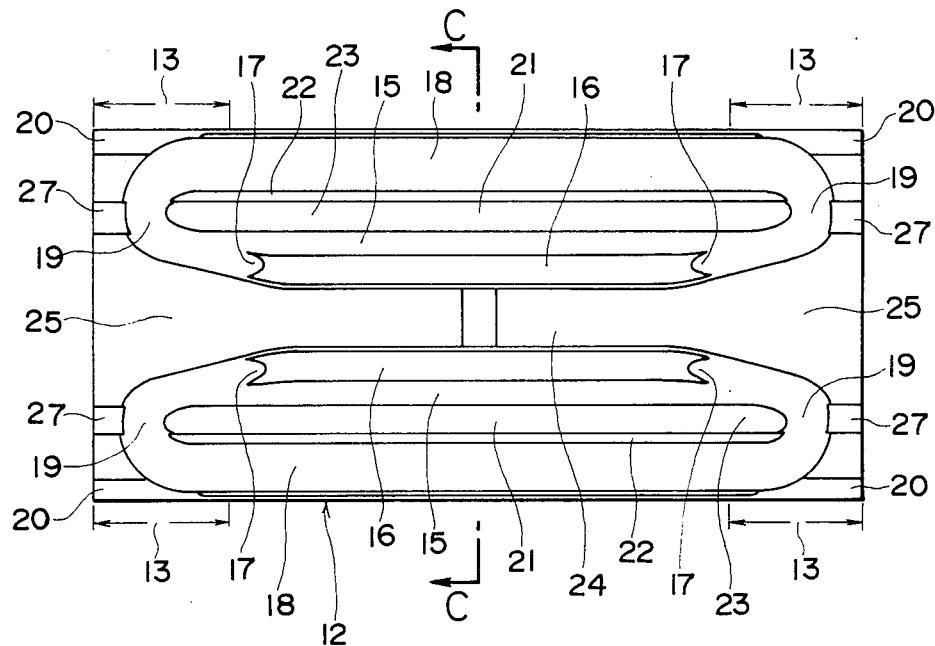
FIG. 5 is a plan view of a cage employed in the endless ball spline.
Figure 6:
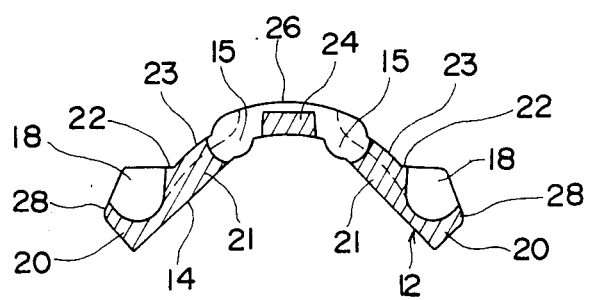
FIG. 6 is a sectional side view taken along the line C—C in FIG. 5.
Figure 10:
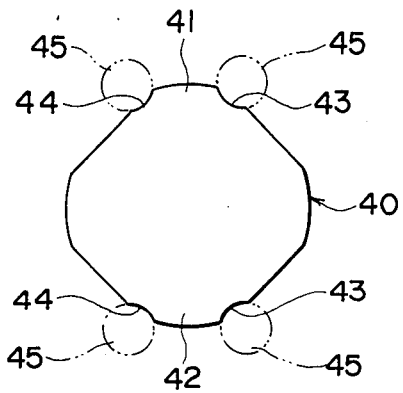
FIG. 10 is a front view of a spline shaft.
Figure 11:
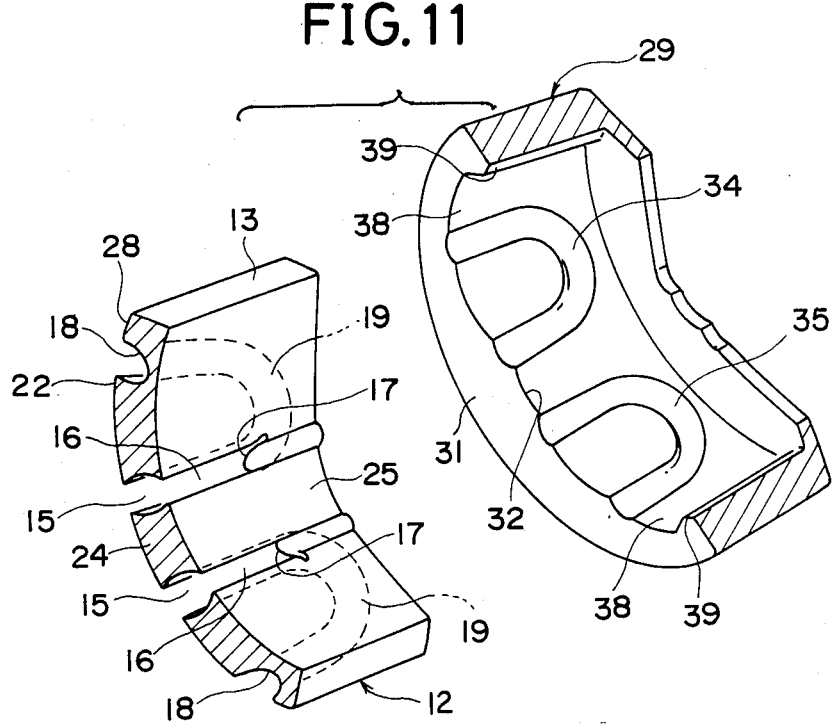
FIG. 11 is a partially-cutaway perspective view showing ball turning grooves formed in a projecting portion of one cage and the corresponding ball turning grooves formed in one end cover.

A pair of cages 12 are fitted inside the outer casing 1 in opposing relation to each other. The inner peripheral surface 14 of each cage 12 has a substantially V-shaped cross-section so that a slight clearance is produced between the cages 12 and the spline shaft 40 which is received in the area defined between the cages 12 (see FIGS. 2 and 6). Each cage 12 has annular grooves formed in the outer peripheral surface thereof. Among these annular grooves, loaded ball grooves 15 which correspond to one pair of loaded ball guide grooves 4 formed in one U-shaped groove 5 of the outer casing 1 are provided in the substantially central portion of each cage 12. Each loaded ball groove 15 is provided with a slot 16 having a diameter smaller than the diameter of the balls 45, and tongue pieces 17 formed at both axial ends of the slot 16. Further, non-loaded ball grooves 18 are formed at both lateral end portions, respectively, of each cage 12, each groove 18 being communicated with the corresponding loaded ball groove 15 through ball turning grooves 19 which are provided at both axial ends, respectively, of the cage 12 (see FIG. 5).

Cage securing pieces 20 are formed at both lateral edges, respectively, of each of the axial ends of each cage 12 for the purpose of preventing coming off of the cage 12 when it is fitted into the cage securing grooves 6. The axial end edge 28 of each securing piece 20 is brought into contact with the inner surface of the corresponding cage securing groove 6 thereby allowing the fixing pieces 20 to be accurately positioned and stabilized (see FIGS. 2 and 5).

A partition 21 is defined between each pair of loaded and non-loaded ball grooves 15 and 18. The partition 21 has a supporting side wall 22 provided at the outer peripheral side surface thereof, and a supporting surface 23. The supporting side walls 22 and the supporting surfaces 23 of the partitions 21 formed on the pair of the cages 12 respectively support the partition walls 8, 9 and the side walls 10, 11 thereof, and the cages 12 are thereby positioned even more accurately and at the same time, it is possible to retain the cages 12 as a whole in a more stable state (see FIGS. 2, 5 and 6).

A central connecting piece 24 is formed between end connecting pieces 25 and between the loaded ball guide grooves 15 on each cage 12. The central connecting piece 24 has a horizontal outer surface, while each end connecting piece 25 has a curved outer surface 26 with substantially the same configuration as that of the U-shaped grooves 5 of the outer casing 1 (see FIGS. 5 and 6).

Guide grooves 27 for guiding the partition walls 8 or 9 are formed at both lateral edges, respectively, of each of the end connecting pieces 25 of each cage 12, each guide groove 27 being formed on the same axis as the supporting surface 23 of the corresponding partition 21.

The end covers 29 having a substantially U-shaped cross-section are respectively fitted on the projections 13 provided at both ends of the cages 12 fitted inside the outer casing 1, and connected to the end faces 2, respectively, of the outer casing 1. Each end cover 29 is provided in the center thereof with a through-hole 30 which has a cross-sectional configuration substantially equal to that of the spline shaft 40 and which has a diameter slightly larger than the outer diameter of the spline shaft 40. Each end cover 29 has concave surfaces 32 and 33 at respective positions which are axially inner than the end face 31, the concave surfaces 32 and 33 being coincident with the corresponding curved surfaces 26 of the end connecting pieces 25 formed on the cages 12. Ball turning grooves 34 and 37 are formed on both sides, respectively, of the concave surface 32 in such a manner that the grooves 34 and 37 are respectively coincident with the corresponding ball turning grooves 19 of the cages 12, and ball turning grooves 35 and 36 are similarly formed on both sides, respectively, of the concave surface 33. Further, each end cover 29 has a pair of ridges 39 with a triangular cross-section which project radially from the inner surface thereof in such a manner that the plane which intersects both the ridges 39 is orthogonal with respect to the plane which intersects both the concave surfaces 32 and 33. Grooves 38 having substantially trapezoidal cross-section are formed on both sides, respectively, of each ridge 39 for the purpose of receiving the corresponding cage securing pieces 20, respectively.

The spline shaft 40 has a substantially square cross-section, and ball rolling grooves 43 and 44 are formed on both sides, respectively, of each of the diagonaly oppoing corners 41 and 42 of the shaft 40.

In this embodiment, a highly rigid steel material is employed for the above-described outer casing 1, the spline shaft 40 and the balls 45 since a relatively heavy load acts on these members, whereas a plastic material which has wear resistance and is lightweight as well as moldable is employed for portions or members to which no heavy load is directly applied, such as the cages 12 and the end covers 29.

The endless ball spline of the present invention is assembled in accordance with the following procedure. Namely, the cages 12 are fitted into the outer casing 1 through the U-shapd grooves 5 and the cage securing grooves 6, which are formed in the inner peripheral surface of the outer casing 1. Then, one end cover 29 is fitted on one of the pairs of projections 13 of the combined cages 12 which project from both axial ends, respectively, of the outer casing 1. Subsequently, a multiplicity of balls 45 are inserted, and the other end cover 29 is fitted. Thereafter, the end covers 29 are rigidly welded to the cages 12 by means of a plastic welder to form a bearing body. The spline shaft 40 is then inserted into this bearing body to complete an endless ball spline bearing.

What is claimed is:
1. An endless ball spline comprising:
a spline bearing including an outer casing, a pair of cages fitted inside said outer casing and each having a ball recirculating groove, a pair of end covers respectively fitted on projections formed at both axial ends of said cages and secured to both axial ends, respectively, of said outer casing, and a multiplicity of balls disposed in ball recirculating endless track bores defined by said outer casing, said cages and said end covers; and
a spline shaft supported through the multiplicity of balls in said spline bearing,
said outer casing including: grooves with a U-shaped cross-section provided in the inner peripheral surface thereof, said U-shaped grooves extending over the whole length of said outer casing in parallel with the axis thereof and in bisymmetry with each other; loaded ball guide grooves provided in both side surfaces, respectively, of the bottom of each of said U-shaped grooves; ridges with a triangular cross-section provided on the inner peripheral surface of said outer casing in such a manner that said triangular ridges extend axially over the whole length of said outer casing in parallel to each other and in symmetry with each other with respect to the plane which intersects the respective centers of said U-shaped grooves; cage securing grooves with a substantially trapezoidal cross-section provided on both sides, respectively, of each of said triangular ridges; and annullar slanted surfaces formed at both axial ends, respectively, of the inner periphery of said outer casing, each slanted surface expanding or diverging outward,
said cages having an inner peripheral surface with a substantially V-shaped cross-section, and each cage including: cage securing pieces provided at both longitudinal ends, respectively, of said cage; a plurality of annular grooves provided in the outer peripheral surface of said cage, said annular grooves including loaded ball grooves corresponding to the loaded ball guide grooves on said outer casing, said loaded ball grooves being formed in the substantially central portion of said cage and each having a slot with a diameter slightly smaller than the diameter of said balls; and non-loaded ball grooves formed on both lateral end surfaces of said cage, said non-loaded ball grooves being communicated with the corresponding loaded ball grooves through ball turning grooves which are provided at both ends, respectively, of each of said loaded ball grooves,
said end covers having a substantially U-shaped cross-section and each end cover including: a through-hole provided in its center and having a diameter slightly larger than the outer diameter of said spline shaft; ball turning grooves respectively corresponding to the ball turning grooves provided in said cages; a pair of axially extending ridges with a triangular cross-section provided on the inner peripheral surface of said end cover so that said triangular ridges can be respectively aligned with the corresponding triangular ridges formed inside said outer casing; and grooves with a substantially trapezoidal cross-section provided on both sides, respectively of each of said triangular ridges, and
said spline shaft having a substantially square cross-section and including loaded ball rolling grooves formed on both sides, respectively, of each of one pair of diagonally opposing corners thereof.

* * * * *